US012455905B1

United States Patent
Swamy et al.

(10) Patent No.: US 12,455,905 B1
(45) Date of Patent: Oct. 28, 2025

(54) PROVIDER NETWORK USER CONSOLE WITH NATURAL LANGUAGE QUERYING FEATURE

(71) Applicant: Amazon Technologies, Inc., Seattle, WA (US)

(72) Inventors: Sandesh Swamy, Seattle, WA (US); Rashmi Gangadharaiah, San Jose, CA (US); James W. Horsley, Carnation, WA (US); Abhijit S Barde, Cupertino, CA (US); Jonathan James Pezzino, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 298 days.

(21) Appl. No.: 18/083,197

(22) Filed: Dec. 16, 2022

(51) Int. Cl.
*G06F 40/58* (2020.01)
*G06F 16/31* (2019.01)
*G06F 16/3329* (2025.01)
*G06F 16/3332* (2025.01)

(52) U.S. Cl.
CPC ........ *G06F 16/316* (2019.01); *G06F 16/3329* (2019.01); *G06F 16/3332* (2019.01); *G06F 40/58* (2020.01)

(58) Field of Classification Search
CPC .... G06F 16/316; G06F 16/31; G06F 16/3329; G06F 16/3332; G06F 40/58
See application file for complete search history.

(56) References Cited

U.S. PATENT DOCUMENTS

| | | | |
|---|---|---|---|
| 10,073,882 B1* | 9/2018 | Gupta | G06F 16/93 |
| 12,182,174 B1* | 12/2024 | Beckert | G06F 16/9577 |
| 2010/0023497 A1* | 1/2010 | Magdy | G06F 18/2137 |
| | | | 715/256 |
| 2021/0011933 A1* | 1/2021 | Liu | G06F 16/316 |

(Continued)

OTHER PUBLICATIONS

Bahdanau et al., "Neural Machine Translation by Jointly Learning to Align and Translate", arXiv: 1409.0473v7, May 19, 2016, pp. 1-15.

(Continued)

*Primary Examiner* — Huyen X Vo
(74) *Attorney, Agent, or Firm* — Nicholson De Vos Webster & Elliott LLP

(57) ABSTRACT

Techniques for a provider network user console with a natural language querying feature. The techniques include collecting a set of templatized query pairs. A pair includes a templatized natural language query (NLQ) and a templatized domain-specific index query language query. The set of templatized query pairs is expanded by substituting named variable tokens in the templatized query pairs with synthetic values to create a set of instantiated query pairs. A pre-trained neural machine translation model is retrained using the set of instantiated query pairs to yield a fine-tuned neural machine translation model. For a natural language query received, the fine-tuned neural machine translation model is used to translate the target natural language query to a corresponding domain-specific index query language query. The domain-specific index query language query is then executed against an index to yield an index result. The techniques reduce or eliminate the need for manual training data generation.

20 Claims, 9 Drawing Sheets

(56) References Cited

U.S. PATENT DOCUMENTS

2022/0292085 A1* 9/2022 Shahriar ............... G06N 20/00
2024/0185001 A1* 6/2024 Nagaraju ............. G06F 40/284

OTHER PUBLICATIONS

Cho et al., "Learning Phrase Representations using RNN Encoder-Decoder for Statistical Machine Translation", arXiv: 1406.1078v3, Sep. 3, 2014, 15 pages.

Lewis et al., "BART: Denoising Sequence-to-Sequence Pre-training for Natural Language Generation, Translation, and Comprehension", Proceedings of the 58th Annual Meeting of the Association for Computational Linguistics, Jul. 5-10, 2020, pp. 7871-7880.

Liu et al., "Multilingual Denoising Pre-training for Neural Machine Translation", arXiv:2001.08210v2, Jan. 23, 2020, 17 pages.

Raffel et al., "Exploring the Limits of Transfer Learning with a Unified Text-to-Text Transformer", Journal of Machine Learning Research, vol. 21, 2020, arXiv:1910.10683v3, pp. 1-67.

Sutskever et al., "Sequence to Sequence Learning with Neural Networks", arXiv:1409.3215v3, Dec. 14, 2014, pp. 1-9.

Vinyals et al., "A Neural Conversational Model", arXiv:1506.05869v3, Jul. 22, 2015, 8 pages.

Yu et al., "Spider: A Large-Scale Human-Labeled Dataset for Complex and Cross-Domain Semantic Parsing and Text-to-SQL Task", arXiv:1809.08887v5, Feb. 2, 2019, 11 pages.

\* cited by examiner

| Natural Language Query |
| --- |
| List my log group rns in eu-south-1 |
| What are the RNs of all my resources? |
| What tags does rn:pn:ssm:us-east-2:12345678:document/passenger in us-east-2 have? |
| What is the region of the resource id:rn:pn:logs:ap-south-1:12345678:log-group:computer |
| What region is ds service with tag passenger=presentation in? |
| What services do I use? |
| What are all my batch resource RNs? |
| List everything that matches performance-connection-revenue |
| My resources are in which regions? |
| What do I have in eu-central-1 where collection is growth |

FIG. 2

| Natural Language Query | Domain-Specific Index Query Language Query |
|---|---|
| List my log group rns in eu-south-1 | service:logs region:eu-south-1 |
| What are the RNs of all my resources? | resourcetype:* |
| What tags does rn:pn:ssm:us-east-2:12345678:document/passenger in us-east-2 have? | id:rn:pn:ssm:us-east-2:12345678:document/passenger region:us-east-2 |
| What is the region of the resource id:rn:pn:logs:ap-south-1:56781234:log-group:computer | id:rn:pn:logs:ap-south-1:56781234:log-group:computer |
| What region is ds service with tag passenger=presentation in? | service:ds tag:passenger=presentation |
| What services do I use? | resourcetype:* |
| मैं किन संसाधनों का उपयोग करूँ? | resourcetype:* |
| What are all my batch resource RNs? | service:batch |
| ¿Cuáles son todos mis RN de recursos por lotes? | service:batch |
| List everything that matches performance-connection-revenue | performance-connection-revenue |

*FIG. 3*

| Synthetic Resource Name Templates |
|---|
| rn:pn:svc1:$$REGION$$:$$ACCOUNT_ID$$:alarm:$$NAME$$ |
| rn:pn:svc2:$$REGION$$:$$ACCOUNT_ID$$:function:$$NAME$$:1 |
| rn:pn:svc3:$$REGION$$:$$ACCOUNT_ID$$:db:$$NAME$$ |
| rn:pn:svc4:$$REGION$$:$$ACCOUNT_ID$$:instance/$$NAME$$ |
| rn:pn:svc5:::$$NAME$$ |
| rn:pn:svc6:$$REGION$$:$$ACCOUNT_ID$$:log-group:$$NAME$$ |
| rn:pn:svc7:$$REGION$$:$$ACCOUNT_ID$$:project/$$NAME$$ |
| rn:pn:svc8:$$REGION$$:$$ACCOUNT_ID$$:job/$$NAME$$ |
| rn:pn:svc9:$$REGION$$:$$ACCOUNT_ID$$:$$NAME$$ |
| rn:pn:svc10:::$$ACCOUNT_ID$$:role/$$NAME$$ |
| rn:pn:svc11:$$REGION$$:$$ACCOUNT_ID$$:document/$$NAME$$ |
| rn:pn:svc12:$$REGION$$:$$ACCOUNT_ID$$:$$NAME$$ |
| rn:pn:svc13:$$REGION$$:$$ACCOUNT_ID$$:cluster/$$NAME$$ |
| rn:pn:$$SERVICE$$:$$REGION$$:$$ACCOUNT_ID$$:$$NAME$$ |

FIG. 5

PROVIDER NETWORK USER CONSOLE WITH NATURAL LANGUAGE QUERYING FEATURE

TECHNICAL FIELD

The present disclosure relates generally to artificial intelligence, and more specifically to a new and useful system and method for provider network user console with natural language querying feature.

BACKGROUND

A chatbot is a type of artificial intelligence (AI) that is designed to simulate conversation with human users, typically through a messaging or chat interface. Chatbots are commonly used in customer service, entertainment, and other applications, where they can provide information, answer questions, or perform other tasks.

Chatbots are typically built using natural language processing (NLP) techniques, which allow them to understand and generate human-like language. This allows them to engage in realistic conversations with users, and to provide useful and relevant information or responses.

There are many different types of chatbots, including rule-based chatbots, which use pre-defined rules to respond to user input, and machine learning-based chatbots, which use machine learning algorithms to learn from user input and improve their responses over time.

Chatbots are becoming increasingly common and are used in a wide range of applications, including customer service, e-commerce, and entertainment. They can be useful for providing information, answering questions, and automating repetitive tasks, among other things.

BRIEF DESCRIPTION OF DRAWINGS

Various examples in accordance with the present disclosure will be described with reference to the drawings, in which:

FIG. 2 provides a table listing some examples of natural language queries in terms of provider network resources, services, and regions.

FIG. 3 provides a table listing domain-specific query language queries corresponding to the natural language queries listed in the table of FIG. 2.

FIG. 5 provides a table of service-specific synthetic resource name templates.

Figure 1:
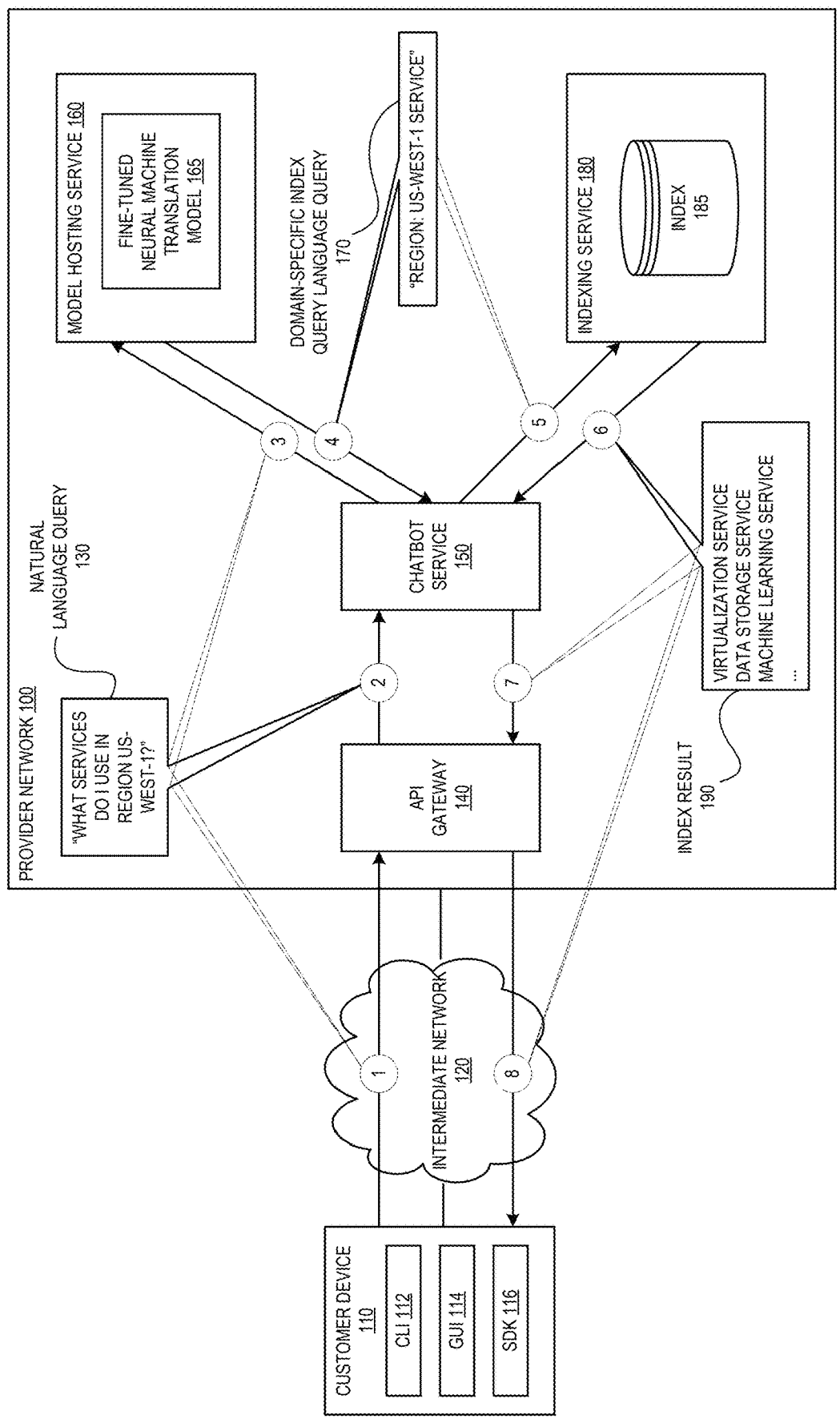
FIG. 1 illustrates a system and a method for a provider network user console with a natural language querying feature.

It will be appreciated that for simplicity or clarity of illustration, elements illustrated in the figures have not necessarily been drawn to scale. For example, the dimensions of an element may be exaggerated relative to another element for clarity. Further, if considered appropriate, reference numerals have been repeated among the figures to indicate corresponding or analogous elements.

DETAILED DESCRIPTION

The following description is not intended to limit the invention to the examples described, but rather to enable any skilled person in the art to make and use this invention.

Overview

Systems, methods, and non-transitory computer-accessible media (collectively "techniques") for a provider network user console with a natural language querying feature.

The techniques include storing an index of a provider network object identifiers. Each provider network object identifier identifies a provider network resource, a provider network region, or a provider network service. The techniques further include collecting a set of templatized query pairs. Each templatized query pair includes a templatized natural language query (NLQ) and a templatized domain-specific index query language query. The domain-specific index query language is designed for querying the index. The techniques further include expanding the set of templatized query pairs by substituting named variable tokens in the templatized query pairs with synthetic values to create a set of instantiated query pairs. The techniques further include retraining a pre-trained neural machine translation model using the set of instantiated query pairs to yield a fine-tuned neural machine translation model. The techniques further include providing a first graphical user interface for inputting a natural language query. For a "target" natural language query received via the first graphical user interface, the techniques further include using the fine-tuned neural machine translation model to translate the target natural language query to an "output" domain-specific index query language query. The techniques further include executing the output domain-specific index query language query against the index to yield an index result and providing a second graphical user interface that presents the index result.

When implemented by a provider network, the techniques improve the operation of the provider network. The techniques reduce or eliminate the need for manual training data generation. The techniques generate training data by a computer program or algorithm, rather than having to collect training data from real-world sources. The techniques can be used to train a neural machine translation model for a domain-specific task of translating natural language queries to domain-specific index query language queries where there is not enough real data available or where collecting real data presents privacy or other concerns. Additionally, the techniques can be used to generate training data in large quantities, which is useful for training large, complex neural machine translation models for the domain-specific task.

Figure 8:
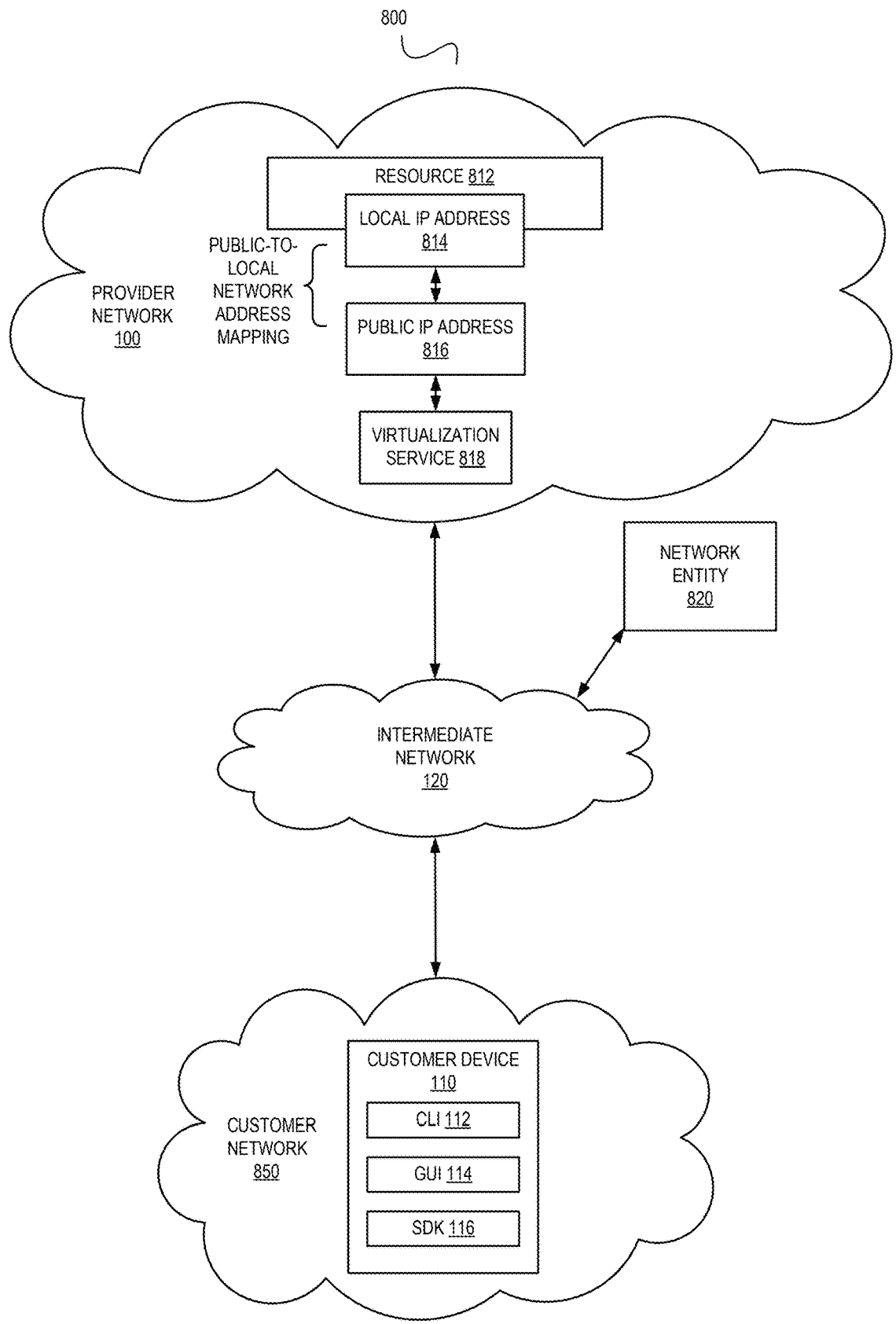
FIG. 8 illustrates an example of a provider network environment in which the techniques disclosed herein are implemented.

FIG. 1 illustrates a system for a provider network user console with a natural language querying feature. The system includes a provider network 100 and a customer device 110 connected to the provider network 100 via an intermediate network 120. The provider network 110, the customer device 110, and the intermediate network 120 are explained in greater detail below with respect to FIG. 8 illustrating an example of a provider network environment in the techniques disclosed herein may be implemented. For now, customer device 110 may be viewed as a computing device capable of processing data and performing computations. For example, customer device 110 can be a personal computer, a smartphone, a tablet computer, or other electronic device capable of running applications and performing tasks such as storing, retrieving, and manipulating data. And intermediate network 120 may be viewed as a data communications network that is specifically designated to transmit data from one device to another. For example, intermediate network 120 can be a local area network (LAN) that connects customer device 110 to the provider network 100 within a single building or physical facility, or a wide area network (WAN) that connects customer device 110 to the provider network 100 that are at different geographic locations. Intermediate network 120 can use a variety of communication technologies and protocol to transmit data such as Ethernet, Wi-Fi, or cellular technology.

The provider network 100 includes an Application Programming Interface (API) gateway 140, a chatbot service 150, a model hosting service 160, and an indexing service 180. Generally, a service (e.g., gateway 140, chatbot service 150, model hosting service 160, or indexing service 180) in the provider network 100 is a piece of software performs a specific task or provides a specific functionality. Services are often independent of other components of the system, and can be accessed and used by other components of the system through a well-defined interface, such as an API. An API is a set of rules and protocols that define how different software applications can interact with each other. An API allows one piece of software to access the functionality of another piece of software, making it easier for developers to integrate different systems and create complex, interdependent applications. Services are often designed to be modular and reusable, so that they can be easily integrated into different systems and used in different contexts. This makes it easier for developers to build complex, interconnected applications by combining different services in different ways. There are many different types of services that could be present in provider network 100, including web services, database services, messaging services, and microservices. Each type of service serves a different purpose and provides different functionality. The provider network 100 can include services other than the ones depicted in FIG. 1.

API gateway 140 is a server or set of servers that acts as an intermediary between an application (e.g., executing at customer device 110) and the backend services (e.g., chatbot service 150) that the application accesses. API gateway 140 can be used in microservice architectures, where different services are responsible for different parts of an application's functionality. The API gateway 140 acts as an entry point for backend services, providing a consistent interface for the application to access them. This allows the application to communicate with the backend services without having to know the details of their individual implementations. Additionally, the API gateway 140 can provide other functionality, such as authentication, rate limiting, and caching.

Model hosting service 160 is a service in the provider network 100 that hosts and executes machine learning models including fine-tuned neural machine translation model 165. Generally, a machine learning model encompasses a mathematical representation of a real-world process or system. It is trained on a dataset and uses that data to make predictions or decisions about new, unseen data. A machine learning model encompasses of a set of parameters that are adjusted during training. The training process involves presenting the model with the input data and the corresponding correct output and adjusting the model's parameters to minimize the error between the predicted output and the correct output. After the model has been trained, it can be used by model hosting service 160 to make predictions or decisions (inferences) about new, unseen data. The accuracy of the model's inferences is determined by how well the model has learned the relationship between the input and the output during training.

Model hosting service 160 provides an API to other services in the provider network 100. The API allows the other services to request inference operations of machine learning models hosted by model hosting service 160. The API also allows the services to receive the results (inferences) of model hosting service 160 performing the request inference operations. Model hosting service 160 may use a variety of technologies to execute machine learning models include virtual machine technology, container technology, or machine learning acceleration technology. A virtual machine is a software program that emulates the functionality of a physical computer. It allows multiple operating systems and applications to run on the same physical computer, each in its own virtual environment. This allows users to run different operating systems and applications on the same computer without the need to have multiple physical machines. Virtual machines are often used in cloud computing environments to provide a scalable and flexible way to allocate computing resources. They can also be used to test and run applications in different operating environments without the need to have separate physical machines for each environment. A container is a lightweight and portable unit of software that packages up code and all its dependencies so the application can run quickly and reliably from one computing environment to another. Containers allow developers to create, deploy, and run applications in a consistent and isolated environment, without the need to worry about dependencies or conflicts with other applications. This makes it easier to develop, test, and deploy applications, as well as scale and manage them in production. Containers are typically used in combination with container orchestration tools, such as KUBERNETES, to manage and deploy large numbers of containers across a cluster of machines. A machine learning accelerator is a hardware device or module that is specifically designed to accelerate the training and inference processes of machine learning models. These accelerators are typically used in conjunction with a computer's central processing unit (CPU) to boost the performance of machine learning workloads. They can be integrated into the computer's mainboard, added as a separate card or module, or connected over a high-speed interface such as PCI Express. Some examples of machine learning accelerators include the ELASTIC INFERENCE ACCELERATOR from AMAZON.

In some implementations, fine-tuned neural machine translation model 165 encompasses a deep neural network model. A neural network model is a type of machine learning model that is modeled after the structure and function of the human brain. It encompasses of a large number of interconnected "neurons" that process and transmit information. Neural network models are typically organized into layers, with the input layer receiving input data, one or more hidden layers processing the data, and an output layer providing the final output of the network. Each neuron in a layer is connected to the neurons in the adjacent layers, allowing information to flow through the network. Neural network models are trained using large amounts of data and a variant of gradient descent called backpropagation. During training, the weights of the connections between the neurons are adjusted to minimize the error between the predicted output of the network and the actual output. This allows the network to learn to make accurate predictions based on the input data. A deep neural network (DNN) is a type of neural network model that has multiple layers of interconnected "neurons". These layers allow the network to learn more complex relationships between the input data and the output predictions. Deep neural network models are typically composed of multiple hidden layers, in addition to the input and output layers. The hidden layers extract features from the input data and use them to make predictions. The number of hidden layers and the number of neurons in each layer can vary, depending on the complexity of the problem being solved.

In some implementations, fine-tuned neural machine translation model 165 encompasses a type of deep neural network referred to as a sequence-to-sequence model or seq2seq model. A seq2seq model encompasses two separate neural networks: one that encodes the input sequence, and another that decodes the output sequence. The encoder takes a sequence of input data and maps it to a higher-dimensional space called the "encoding space". The decoder then takes the encoding space as input and generates the output sequence.

In some implementations, fine-tuned neural machine translation model 165 encompasses an encoder-decoder seq2seq model. The encoder-decoder model encompasses two separate RNNs: an encoder and a decoder. The encoder maps the input sequence to the encoding space, and the decoder generates the output sequence from the encoding space. A recurrent neural network (RNN) is a type of neural network that is designed to process sequential data. It is called "recurrent" because it makes use of feedback connections, allowing information to flow through the network over time. An RNN encompasses of a series of interconnected "neurons" that process the input data in sequence. The neurons in an RNN have memory, allowing them to retain information about the past input data that has been processed. This allows the network to make predictions about the future based on the input data that it has seen so far.

In some implementations, fine-tuned neural machine translation model 165 encompasses a transformer seq2seq model. The transformer model is a more complex type of seq2seq model. It uses a combination of self-attention mechanisms and feedforward neural networks to map the input sequence to the encoding space, and then generate the output sequence from the encoding space. A feedforward neural network is a type of neural network in which the information flows through the network in only one direction, from the input layer to the output layer, without looping back. In a feedforward neural network, the information passes through multiple layers of interconnected nodes, called neurons, and is transformed and processed at each layer before being passed to the next layer. The weights of the connections between the neurons are adjusted during the training process, allowing the network to learn how to map the input data to the desired output.

In some implementations, model 165 encompasses a bidirectional encoder and an autoregressive decoder. The bidirectional encoder encompasses two separate RNNs: a forward RNN and a backward RNN. The forward RNN processes the input sequence from left to right, while the backward RNN processes the input sequence from right to left. The output of the two RNNs is then combined to create the encoded representation of the input sequence. Using a bidirectional encoder allows the model 165 to capture contextual information from both the past and the future of the input sequence, which can improve the performance of the model 165 on the task of translating natural language queries to domain-specific index query language queries. The autoregressive decoder generates the output sequence one element at a time, using the previously generated elements of the output sequence as input. This means that the output at each time step is a function of the previous outputs, as well as the encoded representation of the input sequence. The autoregressive decoder for the task of translating natural language queries to domain-specific index query language queries where the length of the output sequence is not fixed, as the model 165 can generate output sequences of arbitrary length.

In some implementations, model 165 encompasses a transformer encoder and a transformer decoder. The transformer encoder is a type of encoder that is used in the transformer model. It is based on the concept of self-attention, which allows the model 165 to capture dependencies between different elements of the input sequence in a more flexible way than RNNs. The transformer encoder encompasses multiple "layers", each of which encompasses a self-attention mechanism and a feedforward neural network. The self-attention mechanism allows the model 165 to capture dependencies between the elements of the input sequence, while the feedforward neural network processes the output of the self-attention mechanism to generate the encoded representation of the input sequence. The transformer encoder is used in combination with the transformer decoder to generate the output sequence. The transformer decoder encompasses multiple "layers", each of which encompasses a self-attention mechanism and a feedforward neural network. The self-attention mechanism allows the model to capture dependencies between the elements of the output sequence, while the feedforward neural network processes the output of the self-attention mechanism to generate the final output sequence.

In some implementations, model 165 is based on a denoising seq2seq model. A denoising seq2seq model is used to denoise a noisy input sequence. The model is a variant of a standard seq2se2 model that uses a denoising autoencoder as the encoder and a RNN decoder to generate the output sequence. In a denoising seq2seq model, the encoder is trained to reconstruct the original, clean input sequence from a noisy version of the input sequence. This allows the model 165 to learn to filter out noise from the input data. The decode is then trained to generate the output sequence from the encoded representation of the clean input sequence.

In some implementations, model 165 is based on a multilingual denoising seq2seq model which is a type of seq2seq model that is used to denoise noisy input sequences in multiple languages. It is a variant of the denoising seq2seq model that is trained on multiple languages, allowing it to denoise input sequences in any of the languages that it has been trained on. In a multilingual denoising seq2seq model, the encoder is trained to reconstruct the original, clean input sequence from a noisy version of the input sequence, regardless of the language of the input. This allows the model 165 to learn to filter out noise from the input data in multiple languages. The decoder is then trained to generate the output sequence from the encoded representation of the clean input sequence, again regardless of the language of the input.

Indexing service 180 is a service in the provider network 100 that supports a domain-specific index query language. An example domain-specific index query language is used in examples herein. However, the techniques are not limited to any particular domain-specific index query language and the techniques can be used with any domain-specific index query language that is used to retrieve and manipulate data from an index that indexes data in a particular domain. In examples herein, the domain encompasses provider network services, resources, customer accounts, regions, and the associates therebetween. However, the techniques are not limited to any particular domain.

The domain-specific index query language can be used to perform tasks such as selecting, inserting, updating, and deleting data in the domain from the index 185. The index 185 is a data structure that allows for the efficient organization and retrieval of the domain data. In the context of indexing service 180, the index 185 is a structure that is used to improve the performance of domain-specific index query language queries. The index 185 is created on a specific column or set of columns in a database table and allows the indexing service 180 to quickly find and retrieve the rows of the table that match the specified criteria. This can significantly improve the performance of domain-specific index query language queries, especially when working with large datasets. The domain-specific index query language is designed specifically for querying and manipulating domain data stored in index 185. The query language allows users to specify the domain data they want to retrieve or modify in the index 185 and provides the necessary tools and syntax to do so. The query language provides a set of commands, functions, and operators that can be used to specify the domain data to be retrieved or modified, as well the conditions under which the domain data should be retrieved or modified. However, there is no requirement that the domain-specific index query language support domain data modification operations such as inserting, updating, or deleting domain data and the domain-specific index query language may support only retrieving operations such as selecting or reading domain data.

FIG. 1 illustrates a method for a provider network user console with a natural language querying feature. Steps/operations of the method are depicted by numbered circles overlaying directed arrows that represent a direction of data flow but not necessarily the exclusive direction. Data is transmitted between components of the system in requests and responses. A request is a message that is sent from one electronic device to another to request information or a specific action. In addition to a payload that contains the transmitted data, a request can encompass a method, which specifies the type of action to be performed, and a set of headers, which provide additional information about the request. The receiver of the request uses, retrieved, or modifies the data and sends a response back to the requester. The response can include a status code, which indicates the success or failure of the request, and a body, which contains the data or information that was requested. One example type of request and type of response that can be used in an implementation of the techniques disclosed herein is a Hyper Text Transfer Protocol (HTTP) request and a HTTP response.

At step/operation 1, a natural language query 130 is sent from customer device 110 to API gateway 140 via intermediate network 120. In this example, the natural language query 130 is "What services do I use in region US-WEST-1?" The provider network 100 may be divided into regions. A region is a geographic location in the world, at which the operator of the provider network 100 operates services. For example, the provider network 100 may be operated in ten or twenty different locations around the world. Having the provider network 100 spread across regions allows the provider network 100 to serve users with services in the region that is geographically closest to the users. For example, users in the United States may access a region in the United States while users in Europe may access a region in Europe. Having the provider network 100 spread across regions also allows for compliance with different laws and regulations related to data storage and provides fault tolerance in case of natural disaster. The natural language query 130 may be input by a user of customer device 110 such as via CLI 112 or GUI 114 where an application at the customer device 110 driving the CLI 112 or GUI 114 causes the natural language query 130 to be sent to the API gateway 140. Additionally, or alternatively, the natural language query 130 may be generated programmatically (e.g., using SDK 116) and caused to be sent by SDK 116 to API gateway 140. In either case, the natural language query 130 is received in the context of a customer account. For example, the user of the customer device 110 can authenticate using credentials or a secret associated with the customer account. The natural language query 130 can be accompanied with a session token or other authentication token that securely establishes the identity of the customer account in the context of which the natural language query 130 is being made. The provider network 100 may support many customer accounts (e.g., millions) and a natural language query can be submitted in the context of any one of them.

While examples herein encompass natural language queries in the English language, the technique are not limited to any particular spoken or written language. For example, fine-tuned neural machine translation model 165 can be trained and configured to translate natural language queries in one of a predefined set of languages into a corresponding domain-specific index query language query. The predefined set of languages may be determined based on the set of languages encompassed by the training examples used to train the fine-tuned neural machine translation model 165. Note that in a multi-lingual implementation, natural language questions in different languages but that seek the same information may be translated by the model 165 to the same domain-specific index query language query. In some implementations, a single fine-tuned neural machine translation model is used to translate natural language questions in multiple languages. In some implementations, a separate fine-tuned neural machine translation model is used for each support language.

While in examples herein the natural language query is a text sequence input by a user (e.g., using a keyboard device or a touch-screen interface), a natural language query can be input by a user by speaking the natural language query. A speech-to-text module can convert audio data capturing the user's spoken natural language query into a text sequence. The text sequence can be input to the fine-tuned model 165 for translation to a domain-specific index query language query. For example, customer device 110 may be configured with or coupled to a microphone. A user of the customer device 110 can speak natural language query 130 into the microphone and audio data can be created at the customer device 110 that captures the spoken natural language query 130. A speech-to-text module at the customer device 110 can convert the audio data to natural language query 130 in text form. Alternatively, the audio data can be sent via intermediate network 120 to provider network 100 and a speech-to-text module in provider network 100 (e.g., at API gateway 140 or chatbot service 150) can convert the natural language query 130 in audio data form to natural language query 130 in text form. Likewise, index result 190 in text form can be converted to audio data by a text-to-speech module and the audio data played to the user of customer device 110 via a speaker of or coupled to device 110.

A customer account is associated with one or more resources in the provider network 110 that are provisioned to, allocated to, assigned to, or owned by the customer account. A resource is an entity in the provider network that the customer account can work with. The provider network 100 can support many different types of resources (e.g., hundreds of different types) and can include both physical (hardware-implemented) resources and logical (software-implemented) resources. Each resource has a type and an identifier. Each resource is provided by a service offered by the provider network 100. For example, a key-value database service in the provider network 100 may store sets of key-values in tables. Each table may be a resource having a type indicating that the table is a key-value database table and an identifier that uniquely identifies the table. As another example, a data storage service in the provider network 100 may store customer in logical data containers referred to as "buckets." Each bucket is a resource having a type indicating that the bucket is a bucket-type data storage container and an identifier that uniquely identifies the bucket. As yet another example, a virtualization service in the provider network 100 may provide on-demand virtual machine instances. Each VM instance is a resource having a type indicating that the instance is a VM instance and an identifier that uniquely identifies the VM instance.

Resources exist or are located in regions. The resources associated with a customer account may all be located in one region or may be distributed across multiple regions. In addition to resources being associated with a customer account, the services that provide those resources to the customer account can also be associated with the customer account. The associations between customer accounts, resources, services, and regions can be stored index 185. Thus, index 185 may encompass customer account identifiers, resource identifiers, service identifiers, and region identifiers. Index 185 may store additional information. For example, resources may be tagged. A tag is an arbitrary key-value pair that serves as customer-specific or provider network 100-specific metadata for the tagged resource. These tags can also be stored in index 185 associated with the resources they tag.

Resources are identified with a specially formatted resource name. A resource name uniquely identifies a resource unambiguously across the provider network 100 including across different regions and services. For example, the resource name can have the following uniform resource indicator (URI) format with the <region> and the <account-id> parameters both being optional:

"rn:<partition>:<service>:<region>:<account-id>:<resource-id>"

The prefix "rn" is used to designate the string as a resource name. The <partition> parameter identifies a group of regions in the provider network 100 to which the resource is scoped. For example, the <partition> parameter could identify all regions in the provider network 100 or identify all regions in the provider network 100 in a particular country or geographic region or identify all regions in the provider network 100 dedicated to a particular organization (e.g., a particular governmental organization). The <service> parameter identifies a service/product offered by the provider network 100 that provides the resource. The <region> parameter identifies a region in the provider network 100 where the resource is located. The <account-id> parameter identifies a customer account that owns the resource. The <resource-id> parameter identifies the resource. For example, a virtual machine instance 987654321 owned by customer account "123456789" and located in region "US-EAST-1" might have the resource name:

"rn:pn:vs:us-east-1:123456789:instance/987654321"

Here, the value "pn" of the <partition> parameter identifies all regions in the provider network 100 and the value "vs" of the <service> parameter identifies the virtualization service offered by the provider network 100. The value of the <resource-id> parameter has two parts in a path format with the "instance" part of the path identifying the type of resource which in this example is a virtual machine instance and the other part of the path uniquely identifying the virtual machine instance.

Natural language query 130 is just one example of a possible natural language query. FIG. 2 provides a table 200 listing some other examples of natural language queries in terms of provider network resources, services, and regions.

At step/operation 2, the natural language query 130 is sent to the chatbot service 150. Upon receiving the natural language query 130 from the API gateway 140, the chatbot service 150 at step/operation 3 sends the natural language query to the model hosting service 160. At the model hosting service 160, the fine-tuned neural machine translation model 165 is executed using the natural language query 130 as input. As output, the model 165 produces a translation of the query 130 in a domain-specific index query language as domain-specific index query language query 170. Domain-specific query 170 is just one example of a possible domain-specific index query language query. FIG. 3 provides a table 300 listing domain-specific query language queries corresponding to the natural language queries listed in table 200 of FIG. 2.

At step/operation 4, the translation of the natural language query 130 to domain-specific query 170 is returned to the chatbot service 150. At step/operation 5, the chatbot service sends the domain-specific query 170 to the index service 180 for execution against the index 185. The indexing service 180 executes the domain-specific query 170 to obtain an index result 190. The index result is returned to the chatbot service 150 by the indexing service 180 at step/operation 6. At step/operation 7, the index result 190 is returned to the API gateway 140 which in turn, at step/operation 8, returns the index result 90 to the customer device 110. The customer device 110 process the index result 190 such as by displaying or otherwise presenting the index result 190 in the CLI 112 or the GUI 114. Additionally, or alternatively, SDK 116 can process the index result 190 such as by transforming the index result 190 into a different data format or storing the index result 190 in a database or in a file system or providing the index result 190 to another computing process for further processing.

Figure 4:
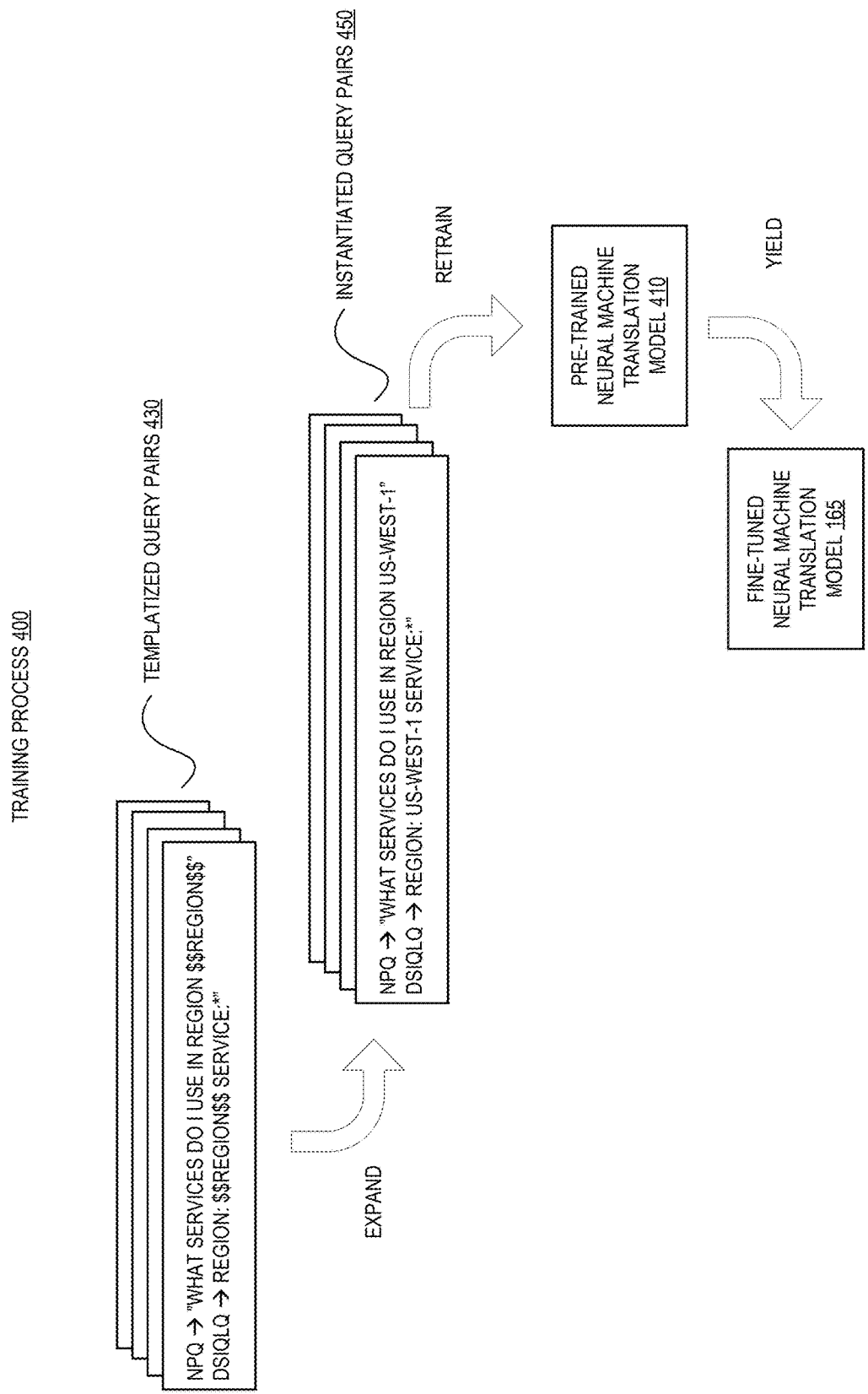
FIG. 4 illustrates a retraining process for generating the fine-tuned neural machine translation model.

FIG. 4 illustrates a retraining process 400 for generating the fine-tuned neural machine translation model 165. The process 400 retrains a pre-trained neural machine translation model 410 based on synthetically generated training data. The synthetically generated training data is in the form of instantiated query pairs 420 that are generated by expanding templatized query pairs 430. Retraining the pre-trained neural machine translation model 410 based on the instantiated query pairs 420 yields the fine-tuned neural machine translation model 165.

Process 400 is useful to transform the pre-trained model 410 that is not particularly well-suited for the particular task of translating natural language queries to domain-specific index query language queries to the fine-tuned neural machine translation model 165 that is better suited for this task. Process 400 synthetically generates training data which is useful when there is a shortage of real-world training examples that are relevant to the particular task (e.g., where gathering real-world training examples would require significant manual effort). A goal met by process 400 is provide the retraining operation with a large and diverse set of training examples that can aid fine-tuned model 165 in generalizing to new, novel inputs without having to substantially or entirely manually collect and curate the training examples.

Process 400 starts with a set of templatized query pairs 430. A templatized query pair can encompass a templatized natural language query or a templatized domain-specific index query language query. The queries are templatized with named variable tokens designated in the queries with a special syntax. In the example, a named variable token is designated using the character sequence '$$' to start and end the named variable token. However, other character sequences to delimit a named variable token in a query are possible and no particular character sequence is required. For example, any of the following character sequences could be used according to the requirements of the particular implementation at hand:

\$\$REGION\$\$
<REGION>
<REGION/>
[[REGION]]
etc.

The named variable of a named variable token indicates a data type. For example, the named variable token $$REGION$$ indicates a "REGION data type. The named variable token $$SERVICE$$ indicates a "SERVICE" data type. The named variable token $$RN_ID$$ indicates a "RN_ID" data type. The named variable token $$ACCOUNT_ID$$ indicates an "ACCOUNT_ID" data type. The named variable token $$TAG_KEY$$ indicates a "TAG_KEY" data type. The named variable token $$TAG_VALUE$$ indicates a "TAG-VALUE" data type.

The training process 400 includes expanding the templatized query pairs 430 into instantiated query pairs 450 by substituting named variable tokens in the templatized query pairs 430 with randomly selected values. The value randomly selected for a given named variable token depends on the data type indicated by the named variable token.

The value of a REGION named variable token is substituted by a region identifier indicating a region of the provider network 100. There may be a predefined set of regions each with a corresponding identifier. When expanding a REGION named variable token, the REGION named variable token may be substituted by a region identifier that is randomly selected from the predefined set of region identifiers. For example, the named variable token $$REGION$$ can be substituted by US-EAST-1 which identifies a region of the provider network 100 in the Eastern portion of the United States where US-EAST-1 is randomly selected from the predefined set of region identifiers.

The value of a SERVICE named variable token is substituted by a value indicating a service in the provider network 100. There may be a predefined set of services each with a corresponding identifier. When expanding a SERVICE named variable token, the SERVICE named variable token may be substituted by a service identifier that is randomly selected from the predefined set of service identifiers. For example, the predefined set of service identifiers may include "DDS" identifying a data storage service in the provider network 100, "VS" identifying a virtualization service in the provider network 100, and "LOG" identifying a logging service in the provider network 100. In this example, the named variable token $$SERVICE$$ can be substituted by LOG which identifying the logging service in the provider network 100 where LOG is randomly selected from the predefined set of service identifiers.

The value of an ACCOUNT_ID named token is substituted by a synthetic account identifier value. The synthetic account identifier value can be randomly generated in the form of an account identifier used by the provider network 100. For example, if the provider network 100 uses 12-digit numbers as account identifiers, then a synthetic account identifier value can be a randomly generated 12-digit number.

The value of a RN_ID named variable token is substituted by a synthetic resource name purporting to identify a resource in the provider network 100. However, the synthetic resource name might not identify an actual resource in the provider network 100, although this is not prohibited. In some implementations, the format of the synthetic resource name is service dependent, and the synthetic resource name is generated according to a service-specific synthetic resource name template. FIG. 5 provides a table 500 of service-specific synthetic resource name templates. The templates include named variable tokens that are substituted with randomly selected values when generating a synthetic resource name from a template. The first thirteen rows of table 500 provide examples of service-specific synthetic resource name templates the last row provides an example of a generic synthetic resource name template that can be used when a service-specific template does not apply.

The value of a NAME named variable token is substituted by a synthetic resource identifier. The synthetic resource identifier value can be randomly generated in the form of a resource identifier used by the provider network 100 which may vary depending on the type of resource.

The value of a TAG_KEY named variable token is substituted by a synthetic tag key value. Generation of the synthetic tag key value can involve randomly selecting a length (number of characters) within a range (e.g., between 1 and 12 alphanumeric characters) and then randomly selecting the length number of alphanumeric characters. The value of a TAG_VALUE named variable token can be generated in the same manner.

By substituting named variable tokens in the templatized query pairs 430 with generated values, the templatized query pairs 430 are expanded into instantiated query pairs 450. A single templatized query pair can be expanded into multiple instantiated query pairs with different generated values. In this way, a relatively small set of templatized query pairs 430 (e.g., a couple or a few hundred templatized query pairs) can be expanded into a relatively large set of instantiated query pairs 450 (e.g., hundreds of thousands of instantiated query pairs).

In some implementations, expanding the templatized query pairs 430 into the instantiated query pairs 450 includes translating natural language questions of instantiated query pairs 450 into different languages to form additional instantiated query pairs for inclusion in the instantiated query pairs 450. This is done so that fine-tuned model 165 supports one or more additional languages in addition to a base language. For example, the natural language queries of templatized query pairs 430 can be in English. The English-language natural language queries can be expanded into instantiated natural language queries by substituting named variable tokens with randomly generated synthetic values as described above. A neural machine translation model can be used to translate each English-language instantiated query pair into an instantiated query pair in another language. For example, a given instantiated query pair (X, Y) where X is an English-language natural language query and Y is a corresponding domain-specific index query language query can be expanded into additional instantiated query pair (X', Y) where X' is the English-language natural language query X translated into another language using a neural machine translation model trained to translate from English-language to the other language. Both query pairs (X, Y) and (X', Y) can be included in the instantiated query pairs 450 on which pre-trained model 410 is retrained.

The pre-trained neural machine translation model 410 is retrained based on the set of instantiated query pairs 450. The pre-trained model 410 can be retrained based only on the instantiated query pairs 450 or based on the instantiated query pairs 450 and other training examples that encompass pairs of natural language queries and corresponding domain-specific index query language queries. For example, the other training examples can be manually authored or collected from log files or via crowdsourcing.

The pre-trained model 410 is like the fine-tuned model 165 in that pre-trained model 410 encompasses a deep neural network model, a sequence-to-sequence (seq2seq) model, an encoder-decoder seq2seq model, a transformer seq2seq model, a denoising seq2se model, or a multilingual denoising seq2seq model. Pre-trained model 410 is trained based on a large base dataset before retraining it based on instantiated query pairs 450 to yield fine-tuned model 165. Using pre-trained model 410 is beneficial because it allows fine-tuned model 410 to incorporating knowledge about general patterns and features of the base dataset which are then fine-tuned through retraining for the specific domain-specific task of translating natural language queries to domain-specific index query language queries. Using pre-trained model 410 also improves the performance of model 165 and saves time and computing resources compared to training a model from scratch for the domain-specific task.

The base dataset for training pre-trained model 410 encompasses a large dataset of input-output pairs. For example, the base dataset can encompass sentences or phrases in one or more written languages and translations of those sentences into the same or different written languages. In some implementations, the base dataset encompasses natural language queries and corresponding queries in a general-purpose database query language such as SQL (Structured Query Language), NoSQL (a non-relational database query language used for working with non-structured data), Datalog (a declarative language for querying databases), or SPARQL (a query language for retrieving and manipulating data stored in the Resource Description Framework (RDF) format.

Once the base dataset is obtained, a supervised or semi-supervised learning algorithm is used to train pre-trained model 410. This involves feeding the input sequences through the encoder of the pre-trained model 410 to generate their vector representations, and then feeding these vectors through the decoder of the pre-trained model 410 to generate the corresponding output sequences. Model 410 is trained to minimize the difference between the predicted output sequences and the ground truth sequences in the base dataset using stochastic gradient descent or a variant thereof and according to a loss function. The loss function measures how well model 410 can predict the correct output sequences given the input sequences in the base dataset. The specific loss function used can vary depending on the task the model 410 is being trained for. For example, the loss function could measure the cross-entropy between the predicted translations and the ground truth translations in the base dataset. The training goal is to minimize the loss function so that the model 410 is able to make more accurate predictions on unseen data.

Once pre-trained model 410 is trained based on the base dataset, it is retrained based on the instantiated query pairs 450. Model 410 can be retrained in a manner similar to how model 410 is originally trained. In particular, retraining may involve feeding the instantiated natural language queries of the query pairs 450 through the encoder of the pre-trained model 410 to generate their vector representations, and the feeding those vectors through the decode of the pre-trained model 410 to generate corresponding output sequences. Model 410 is retrained to minimize the difference between the predicted output sequences and the instantiated domain-specific index query language queries in the query pairs 450 using stochastic gradient descent or a variant thereof and according to a loss function. The loss function measures how well model 410 can predict the correct instantiated domain-specific index query language queries given the instantiated natural language queries in the query pairs 450. The specific loss function used can vary depending on the task the model 410 is being retrained for. For example, the loss function could measure the cross-entropy between the predicted translations and the ground truth translations in the query pairs 450. The retraining goal is to minimize the loss function so that the model 410 is able to make more accurate predictions of domain-specific index query language queries on unseen natural language queries. The result of retraining model 410 is fine-tuned model 165 that is fine-tuned for the task of predicting domain-specific index query language queries from input natural language queries.

Additionally or alternatively, retraining model 410 involves transfer learning. In this case, model 410 that has been trained on a first translation task is used as the starting point for model 165 on the second task of translating natural language queries to domain-specific index query language queries. The goal with transfer learning is to transfer the knowledge that model 410 has learned from the first task to the second task, so that the model 165 can learn to solve the second task more efficiently. Transfer learning is useful in the case where there is a lack of training data for the second task. By starting with a model 410 that has already been trained on a related translation task, the model 165 can task advantage of the knowledge model 410 has already learned and use it to improve the performance of model 165 on the second task. Transfer learning may involve fine-tuning the weights of model 410, using model 410 as a feature extractor, or using pre-trained model 410 as a fixed feature extractor.

Training model 410 or retraining model 410 to yield fine-tuned model 165 can involve use of a validation set. The validation set is a set of data that is used to evaluate performance of pre-trained model 410 or fine-tuned model 165. Model 410 or 165 is trained on a training set and its performance is evaluated on the validation set. Doing so allows the model 410 or 165 to be fine-tuned and improved based on its performance on the validation set.

Training model 410 or retraining model 410 to yield fine-tuned model 165 can involve use of a test set. The test set is a set of data that is used to evaluate performance of pre-trained model 410 or fine-tuned model 165 after it has been trained and validated. Model 410 is trained or retrained on a training set, and its performance is evaluated on the test set. By doing so, the model 410 or 165's performance to be assessed on data that it has never seen before. The test set is different from the training set and the validating set. The training set is used to train ore retrain the model 410, while the validating set is used to evaluate the model 410 or 165 during training and to fine-tune model 410 or 165's parameters. The test set is used to evaluate the final performance of model 410 or 165 after model 410 or 165 has been trained.

Figure 6:
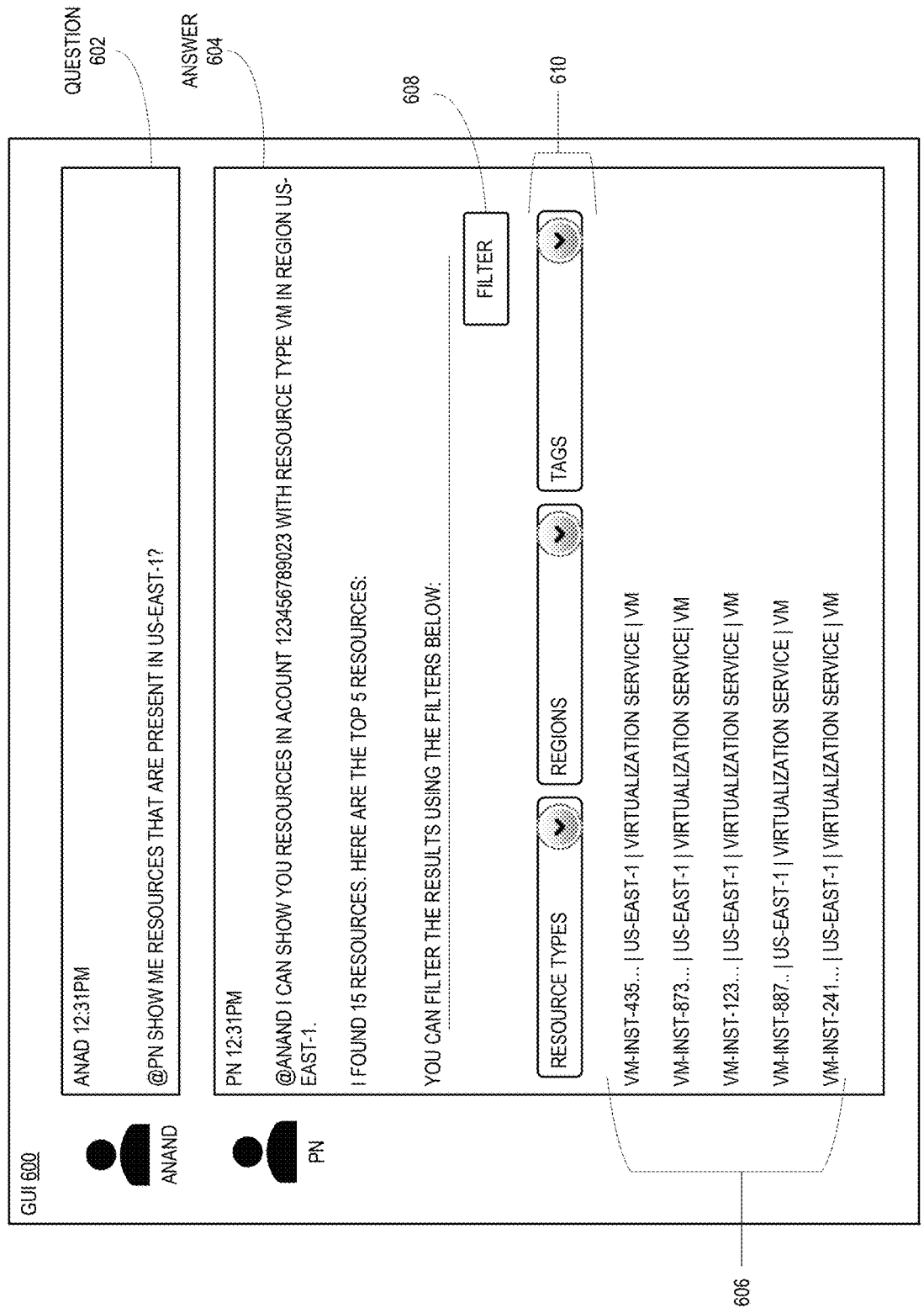
FIG. 6 illustrates an example graphical user interface for a provider network user console with a natural language querying feature.

FIG. 6 illustrates an example graphical user interface 600 for a provider network user console with a natural language querying feature. The GUI 600 may be presented at a customer device, for example. A user has entered a natural language query 602. In response, GUI 600 presents an answer 604 to the question 602. The answer 604 includes an index result that is obtained by translating the question 602 to a domain-specific index query language query and executing the domain-specific index query language query against an index. In this example, the index result includes a listing of the top 5 resources (e.g., top 5 by usage) that are present in the US-EAST-1 region of the provider network and associated with the user's customer account. The answer 604 also provides graphical user interface controls 608 and 610 for filtering the index result 606 by a selected resource type, a selected region, or a selected tag.

Figure 7:
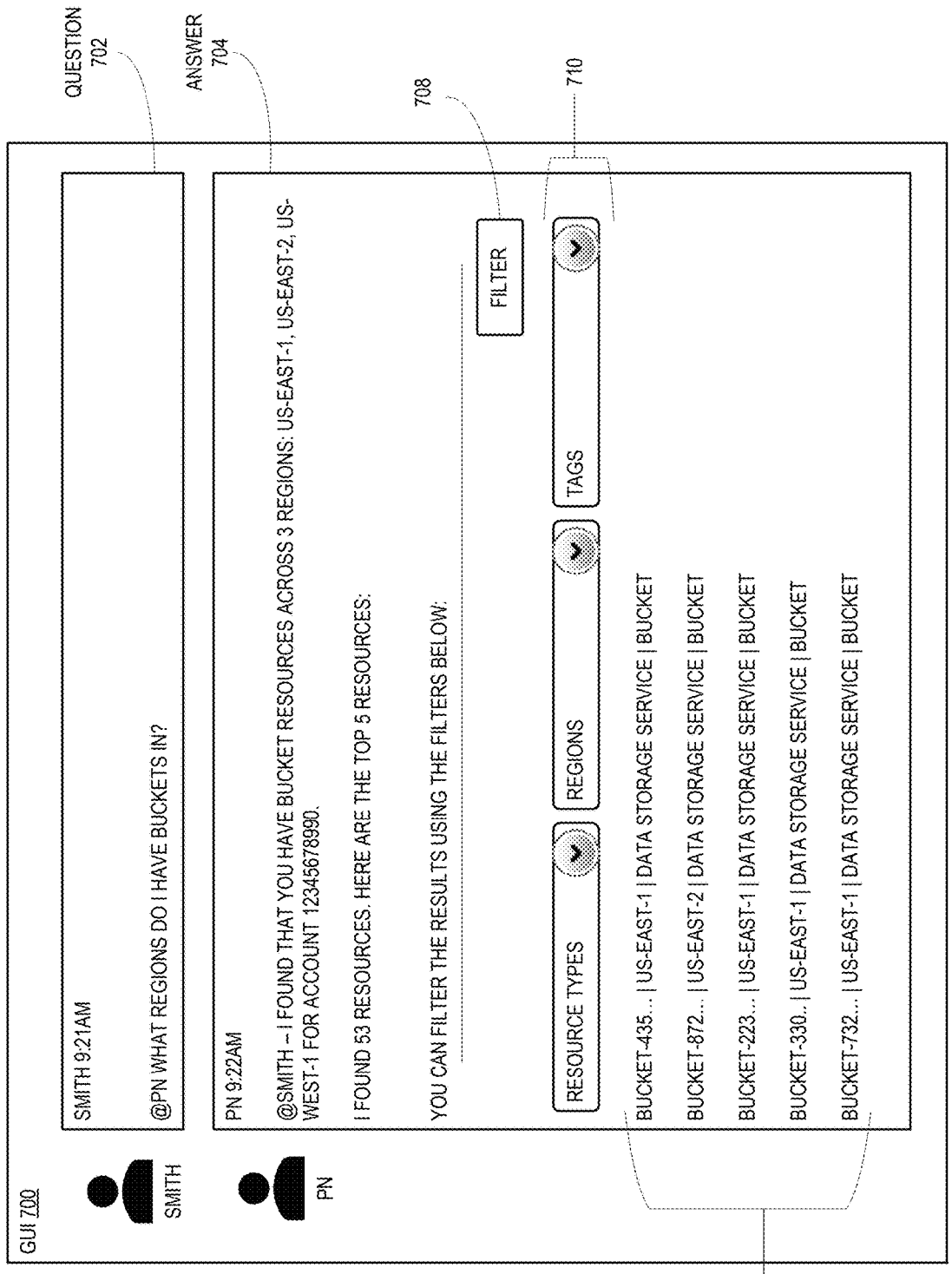
FIG. 7 illustrates an example graphical user interface for a provider network user console with a natural language querying feature.

FIG. 7 illustrates an example graphical user interface 700 for a provider network user console with a natural language querying feature. The GUI 700 may be presented at a customer device, for example. A user has entered a natural language query 702. In response, GUI 700 presents an answer 704 to the question 702. The answer 704 includes an index result that is obtained by translating the question 702 to a domain-specific index query language query and executing the domain-specific index query language query against an index. In this example, the index result indicates that the user's customer account has data storage bucket resources across three different regions of the provider network. A listing 706 of the top 5 data storage bucket resources (e.g., top 5 by usage) is provided as part of answer 704. The answer 704 also provides graphical user interface controls 708 and 710 for filtering the listing 706 by a selected resource type, a selected region, or a selected tag.

Example Provider Network

FIG. 8 illustrates an example provider network environment 800 in which the techniques disclosed herein are implemented. The environment 800 includes the provider network 100, intermediate network 120, and customer network 850. While the intermediate network 120 and the customer network 850 are depicted in FIG. 8 as being external to the provider network 100, the intermediate network 120 and the customer network 850 can alternatively be within the provider network 100.

The provider network 100 functions to provide a computing environment in which the techniques disclosed herein may be implemented. The provider network 100 is programmed or configured to adhere to a cloud computing model. The model enables ubiquitous, convenient, on-demand network access to a shared pool of configurable resources such as virtual machines, containers, networks, servers, storage, applications, services, or any other configurable resource of the provider network 100. The resources can be rapidly provisioned and released with minimal management effort or service provider interaction.

A user of the provider network 100 (sometimes referred to herein as a "customer" of the provider network 100) provisions resources in the provider network 100, such as virtual machines, containers, server time, network storage, or any other resource, as needed automatically with minimal or no human interaction with the service provider. Resources of the provider network 100 may be available over the intermediate network 120 (e.g., the Internet) and accessed through standard mechanisms that promote use by heterogeneous electronic devices such as thin or thick client platforms or any other type of computing platform such as desktop computers, mobile phones, tablet computers, laptop computers, workstation computers, smart appliances, Internet-of-Things (IoT) devices, or any other type of electronic device.

Resources such as compute, storage, processing, memory, and network resources in the provider network 100 are pooled to serve multiple customers using a multi-tenant model, with different physical and virtual resources dynamically assigned and reassigned according to customer demand. There is a sense of location independence in that the customer generally has no control or knowledge over the exact location of provided resources but can specify location at a higher level of abstraction such as, for example, at the level of a country, state, datacenter, or any other location granularity. The provider network 100 automatically controls and optimizes resource use by leveraging a metering capability (e.g., on a pay-per-use, on a charge-per-use basis, on a subscription basis, or any other fee basis) at a level of abstraction appropriate to the type of service such as compute, storage, processing, memory, network bandwidth, active customer accounts, or any other suitable level of abstraction. Resource usage in the provider network 100 is monitored, controlled, and reported, providing transparency for both the provider and the customer of a utilized service.

The provider network 100 can provide its capabilities to customers according to a variety of different service models including Software-as-a-Service (SaaS), Platform-as-a-Service (PaaS), Infrastructure-as-a-Service (IaaS), or any other service model.

With SaaS, a capability is provided to a customer using the provider network 100's software applications running on the infrastructure of the provider network 100. The applications may be accessible from customer device 110 through either a thin client interface such as a command line interface (CLI) 112, a graphical user interface (GUI) (e.g., via a web browser or a mobile or web application) 114, a Software Development Kit (SDK) 116, or any other interface. The CLI 112 is a type of user interface that allows users to interact with a computer program by typing commands into a text-based terminal window (e.g., a text-based terminal window of GUI 114). Unlike the GUI 114, which uses icons, buttons, and menus to display information and provide options for users to choose from, CLI 112 presents the user with a prompt and allows them to enter commands directly. This allows users to interact with the program in a more direct and precise way, and can be particularly useful for advanced users or when working with complex programs. The GUI 114 is a type of user interface that allows users to interact with a computer program through the use of visual elements such as icons, buttons, and menus. The GUI 114 presents the user with a graphical representation of the program's functions and allows them to access and use these functions by clicking on the visual elements with a mouse or other pointing device. This makes the program easier to use and more intuitive for many people, as it allows them to interact with the program in a more visual and familiar way. The SDK 116 is a set of tools that provides a developer with the necessary components to build applications for a specific platform. The SDK 116 typically includes libraries, documentation, and sample code that can be used to develop applications for a particular platform. The SDK 116 can save developers time and effort by providing them with pre-built, tested, and documented components that they can use to build their applications, rather than having to develop everything from scratch. The infrastructure of the provider network 100 includes the hardware resources such as server, storage, and network resources and software deployed on the hardware infrastructure that support the services being provided. Typically, under the SaaS model, the customer does not manage or control the underlying infrastructure including network, servers, operating systems, storage, or individual application capabilities, except for limited customer-specific application configuration settings.

With PaaS, the customer is provided the capability to deploy, onto hardware and software infrastructure of the provider network 100, customer-created or acquired applications using programming languages, libraries, services, and tools supported by the provider network 100 or other sources. Typically, under the PaaS model, the customer does not manage or control the underlying hardware and software infrastructure including network, servers, operating systems, or storage, but can have control over the deployed applications and possibly configuration settings for the application-hosting environment.

With IaaS, the customer is provided the capability to provision processing, storage, networks, and other fundamental computing resources where the customer can deploy and run arbitrary software, which can include operating systems and applications. The customer typically does not manage or control the underlying hardware and software infrastructure but can have control over operating systems, storage, and deployed applications and possibly limited control of selecting network components such as, for example, host firewalls.

The provider network 100 can provide its capabilities to a customer according to a variety of different deployment models including as a private cloud, as a community cloud, as a public cloud, as a hybrid cloud, or any other deployment model.

In a private cloud, the hardware and software infrastructure of the provider network 100 is provisioned for exclusive use by a single organization which can comprise multiple customers. The private cloud is owned, managed, and operated by the organization, a third party, or some combination of them, and it can exist on or off premises.

In a community cloud, the hardware and software infrastructure of the provider network 100 is provisioned for exclusive use by a specific community of customers from organizations that have shared concerns such as mission security requirements, policy, and compliance considerations. The community cloud is owned, managed, and operated by one or more of the organizations in the community, a third party, or some combination of them, and it can exist on or off premises.

In a public cloud, the infrastructure is provisioned for open use by the public. The public cloud is owned, managed, and operated by a business, academic, or government organization, or some combination of them. A public cloud can exist on the premises of the public cloud provider.

In a hybrid cloud, the infrastructure is a composition of two or more distinct cloud infrastructures (private, community, public, or any other cloud infrastructure) that remain unique entities, but that are bound together by standardized or proprietary technology that enables data and application portability such as, for example, cloud bursting for load balancing between clouds.

The provider network 100 provides resource virtualization to a customer of the provider network 100 via a virtualization service 818. The virtualization service 818 allows the customer to purchase, rent, subscribe to, or otherwise obtain use of one or more resources (e.g., resource 812). The provider network 100 may provide resource virtualization service 818 in addition to one or more other services. For example, the provider network 100 may provide a data storage service, a database service, a machine learning service, or any other suitable service.

The resource 812 is a compute, storage, or network resource. The resource 812 is implemented by an electronic device in a datacenter within the provider network 100. The datacenter is a physical facility or building that houses compute, storage, and network infrastructure. The provider network 100 encompasses many resources implemented by many electronic devices distributed over a set of datacenters located in different geographic regions or locations. An example of an electronic device is device 900 described below with respect to FIG. 9.

An example of the resource 812 is a virtual machine (VM). A virtual machine is a compute resource that uses software instead of a physical computer to run a program and deploy an application. A virtual machine (sometimes called a "guest machine") can run on a single physical machine (sometimes called the "host machine"). A virtual machine can execute its own operating system (e.g., UNIX, WINDOWS, LINUX, etc.) and can function separately at least in part from other virtual machines, including those on the same host machine. A virtual machine can be a substitute for a physical machine. A host machine's physical resources can be shared between multiple virtual machines each running its own copy of an operating system. Access to and use of the host machine's physical resources (e.g., hardware processor and physical memory resources) by the multiple virtual machines can be coordinated by a virtual machine monitor (sometimes called a "hypervisor"). The hypervisor itself can run on the bare hardware of the host machine or as a process of an operating system that runs on the bare hardware.

Another example of the resource 812 is a container. A container is like a virtual machine with respect to running separate applications on a single platform. However, a container typically encapsulates a single application or a set of one or more related applications along with runtime dependencies and libraries, while a virtual machine virtualizes the hardware to create a "computer." Another difference is that a container system typically provides the services of an operating system kernel that runs on the bare hardware of the underlying host machine to containers that share the kernel services as orchestrated by the container system. The container system itself can run on the host machine with the aid of the operating system kernel and can isolate the containers from each other to a certain degree. While a container can be used independently of a virtual machine, a container and a virtual machine can be used together. For example, a container can run on an operating system that runs on a virtual machine that runs on a host machine.

While resource 812 can be a virtual machine or a container, resource 812 can be any suitable type of compute, data storage, security, or network resource in the provider network 800.

Within the provider network 100 a local Internet Protocol (IP) address 814 is associated with the resource 812. The local IP address 814 includes an internal or private network address in the provider network 100. The local IP address 814 can be an IPv4 or IPv6 address, for example. For example, the local IP address 814 can be one reserved by Internet Engineering Task Force (IETF) Request for Comments (RFC) 1918 or having an address format specified by IETF RFC 4193 and can be mutable within the provider network 100.

Network traffic originating from a network entity 820 coupled to the intermediate network 120 or from a customer device 110 in the customer network 850 that is destined for the resource 812 in the provider network 100 typically is not directly routed to the local IP address 814. Instead, the network traffic is addressed to a public IP address 816. The public IP address 816 can be mapped within the provider network 100 to the local IP address 814 using network address translation (NAT) or similar technology.

Using the customer device 110 in the customer network 850, the customer uses, controls, operates, or benefits from the virtualization service 818, the resource 812, the local IP address 814, and the public IP address 816 to implement a customer-specific application and offer the application to one or more network entities (e.g., network entity 820) on the intermediate network 120. The network entity 820 can generate network traffic destined for the application by addressing the network traffic for the public IP address 816. The traffic can be routed via the intermediate network 120 to the datacenter of the provider network 100 which houses the electronic device that implements the resource 812. Within the data center, the traffic can be routed to the local IP address 814 where the traffic is received and processed by the resource 812. Response network traffic from the resource 812 can be routed back onto the intermediate network 120 to the network entity 820.

Example Electronic Device

Figure 9:
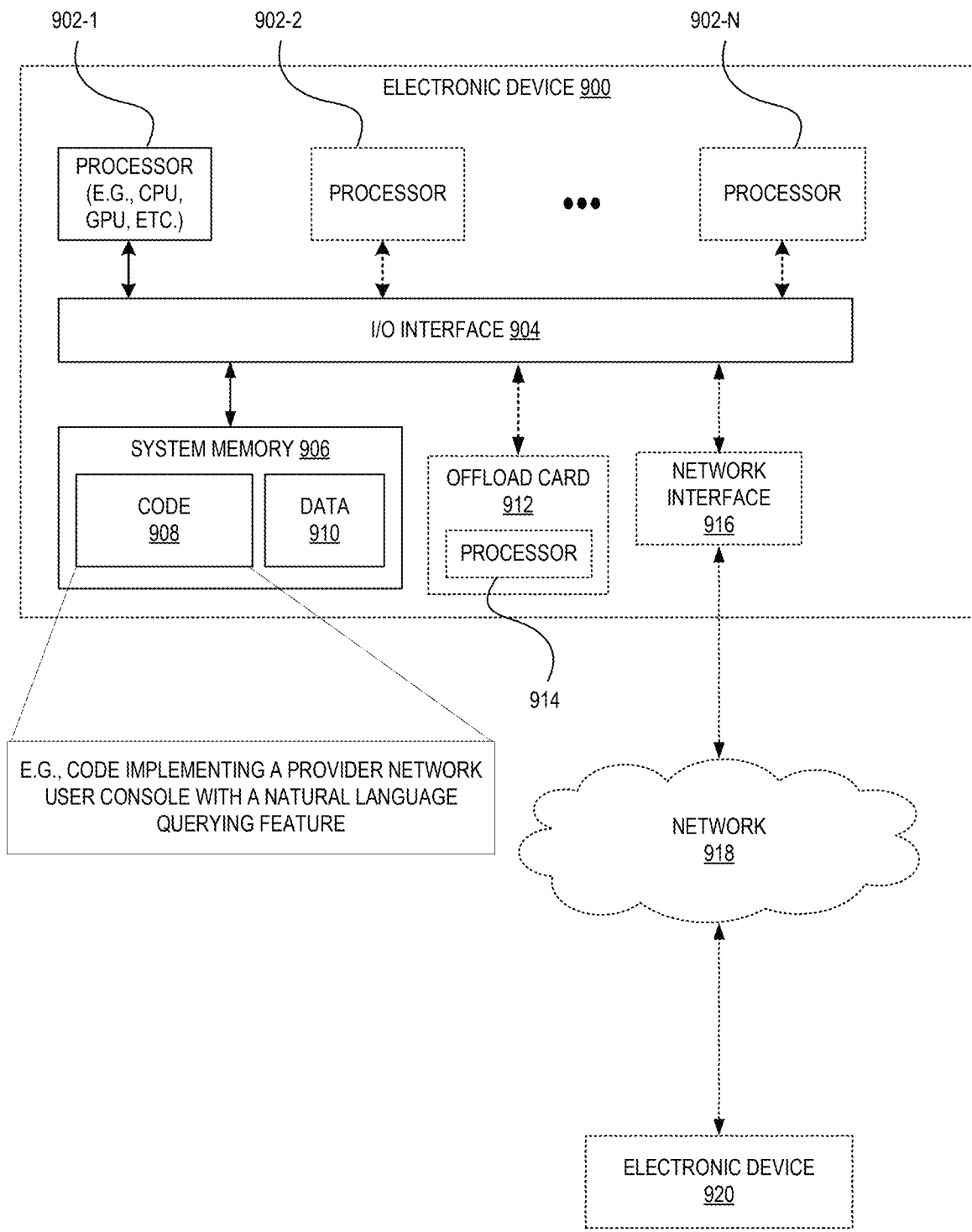
FIG. 9 illustrates an example of an electronic device that is used in an implementation of the techniques disclosed herein.

FIG. 9 illustrates an example electronic device 900 that is used in an implementation of the techniques disclosed herein. Device 900 includes a set of one or more processors 902-1, 902-2, ..., 902-N coupled to system memory 906 via an input/output (I/O) interface 904. The device 900 can further include a network interface 916 coupled to the I/O interface 904.

The device 900 is a uniprocessor system including one processor or is a multiprocessor system including multiple processors. Each of processors 902-1, 902-2, ..., 902-N is any suitable processor capable of executing instructions. For example, each of the processors 902-1, 902-2, ..., 902-N can be general-purpose or embedded processor implementing any of a variety of instruction set architectures (ISAs), such as the X86, ARM, POWERPC, SPARC, or MIPS ISAs, or any other suitable ISA.

The system memory 906 stores instructions and data accessible by the processor(s) 902-1, 902-2, ..., 902-N. The system memory 906 is implemented using any suitable memory technology, such as random-access memory (RAM), static RAM (SRAM), synchronous dynamic RAM (SDRAM), nonvolatile or Flash-type memory, or any other type of memory. Program instructions 908 and data 910 implementing a desired function, such as a method, process, act, or operation of the techniques disclosed herein, are stored within the system memory 906 as code 908 (e.g., executable to implement, in whole or in part, a method, process, act, or operation performed by API gateway 140, chatbot service 150, model hosting service 160, or indexing service 180) and data 910.

The I/O interface 904 is configured to coordinate I/O traffic between the processor(s) 902-1, 902-2, ..., 902-N, the system memory 906, and any peripheral devices in device 900, including, optionally, a network interface 916 or other peripheral interfaces (not shown). The I/O interface 904 performs any necessary protocol, timing, or other data transformations to convert data signals from one component (e.g., the system memory 906) into a format suitable for use by another component (e.g., the processor(s) 902-1, 902-2, ..., 902-N).

The I/O interface 904 includes support for devices attached through various types of peripheral buses, such as a variant of the PERIPHERAL COMPONENT INTERCONNECT (PCI) bus standard or the UNIVERSAL SERIAL BUS (USB) standard, for example (e.g., a bus implementing a version of the PERIPHERAL COMPONENT INTERCONNECT—EXPRESS (PCI-E) standard, or another interconnect such as a QUICKPATH INTERCONNECT (QPI) or ULTRAPATH INTERCONNECT (UPI)). The function of the I/O interface 904 can be split into two or more separate components, such as a north bridge and a south bridge, for example. Also, some of the functionality of the I/O interface 904, such as an interface to the system memory 906, can be incorporated directly into the processor(s) 902-1, 902-2, ..., 902-N.

An optional network interface 916 is configured to allow data to be exchanged between device 900 and another electronic device 920 attached to device 900 via a network 918. The network interface 916 supports communication via any suitable wired or wireless networks, such as a type of wired or wireless Ethernet network, for example. Additionally, the network interface 916 can support communication via telecommunications or telephony networks, such as analog voice networks or digital fiber communications networks, via storage area networks (SANs), such as FIBRE CHANNEL SANs, or via any other suitable type of network or protocol.

The device 900 optionally includes an offload card 912 including a processor 914, and possibly including a network interface (not depicted), that is connected using the I/O interface 904. For example, device 900 can act as a host electronic device (e.g., operating as part of a hardware virtualization service) that hosts compute resources such as compute instances, and the offload card 912 can execute a virtualization manager that can manage compute instances that execute on the host electronic device 900. As an example, the offload card 912 can perform compute instance management operations, such as pausing or un-pausing compute instances, launching or terminating compute instances, performing memory transfer/copying operations, etc. These management operations can be performed by the offload card in coordination with a hypervisor (e.g., upon a request from a hypervisor) that is executed by the processor(s) 902-1, 902-2, ..., 902-N of device 900. However, the virtualization manager implemented by the offload card 912 can accommodate requests from other entities (e.g., from compute instances themselves).

The system memory 906 encompasses one or more computer-accessible media configured to store program instructions 908 and data 910. However, program instructions 908 or data 910 can be received, sent, or stored upon different types of computer-accessible media. Computer-accessible media includes non-transitory computer-accessible media and computer-accessible transmission media. Examples of non-transitory computer-accessible media include volatile or non-volatile computer-accessible media. Volatile computer-accessible media includes, for example, most general-purpose random-access memory (RAM) including dynamic RAM (DRAM) and static RAM (SRAM). Non-volatile computer-accessible media includes, for example, semiconductor memory chips capable of storing instructions or data in floating-gate memory cells composed of floating-gate metal-oxide-semiconductor field effect transistors (MOSFETs), including FLASH memory such as NAND flash and solid-state drives (SSD). Other examples of non-volatile computer-accessible media include read-only memory (ROM), erasable programmable ROM (EPROM), electrically erasable programmable ROM (EEPROM), ferroelectric RAM, and other computer data storage devices (e.g., disk storage, hard disks drives, optical discs, floppy disks, and magnetic tape).

Ordinal terms such as first, second, etc. may be used in the foregoing description and in the appended claims to describe various elements, features, acts, or operations. Unless the context clearly indicates otherwise, such elements, features, acts, or operations are not limited by those terms. The terms are used only to distinguish one element, feature, act, or operation from another. For example, a first device could be termed a second device. The first device and the second device are both devices, but they are not the same device.

Unless the context clearly indicates otherwise, as used in the foregoing description and in the appended claims, the singular forms "a," "an," and "the" are intended to include the plural forms as well.

Unless the context clearly indicates otherwise, as used in the foregoing description and in the appended claims, the terms "comprising," "including," "having," "based on," "encompassing," and other like terms, are used in the foregoing description and in the appended claims in an open-ended fashion, and do not exclude additional elements, features, acts, or operations.

In the case of "based on," the term is used in the foregoing description and in the appended claims in some instances to identify a causal relationship between stated steps, acts or operations. Unless the context clearly indicates otherwise, "A based on B" in these instances means that the performance of step, act, or operation B causes the performance of step, act, or operation A. The causal relationship can be direct (via no intermediate steps, acts, or operations) or indirect (via the performance of one or more intermediate steps, acts, or operations). However, unless the context clearly indicates otherwise, the term "A based on B" is not intended to require the performance of B be necessary in every case to cause the performance of A, and A may be performed in some cases without being caused by the performance of B. Further, unless the context clearly indicates otherwise, the term "A based on B" is not intended to require that the performance of B by itself be sufficient in every case to cause the performance of A, and one or more other steps, acts, or operations in addition to B may be performed in some cases to cause the performance of A. In such circumstances, A can still be based on B even though multiple steps, acts, or operations including B are performed to cause A.

Unless the context clearly indicates otherwise, the term "or" is used in the foregoing description and in the appended claims in its inclusive sense (and not in its exclusive sense) so that when used, for example, to connect a list of elements, features, acts, or operations, the term "or" means one, some, or all the elements, features, acts, or operations in the list.

Unless the context clearly indicates otherwise, conjunctive language in the foregoing description and in the appending claims such as the phrase "at least one of X, Y, and Z," is to be understood to convey that an item, term, etc. can be either X, Y, or Z, or a combination thereof. Thus, such conjunctive language does not require that at least one of X, at least one of Y, and at least one of Z to each be present.

It will be clear to one skilled in the art that the above examples may be altered in many ways without departing from the scope of the invention. Accordingly, the scope of the invention should be determined by the following claims and their legal equivalents.

What is claimed is:

1. A method for a provider network user console with a natural language querying feature, the method comprising:
  receiving a set of templatized query pairs, each templatized query pair of the set of templatized query pairs comprising a first templatized query in a natural language and a corresponding second templatized query in a domain-specific index query language specific to an index hosted by the provider network, each of the first and second templatized queries comprising a set of named variable tokens;
  generating a set of instantiated query pairs comprising substituting the set of named variable tokens with a set of randomly generated synthetic values;
  retraining a pre-trained neural machine translation model using the set of instantiated query pairs to yield a fine-tuned neural machine translation model, the fine-tuned neural machine translation model to translate a natural language query into a domain-specific index query language query;
  receiving a particular natural language query via a user interface;
  translating the particular natural language query to a particular domain-specific index query language query using the fine-tuned neural machine translation model;
  executing the particular domain-specific index query language query against the index to yield an index result; and
  providing the index result via the user interface.

2. The method of claim 1, wherein generating the set of instantiated query pairs is based on:
  determining, for a particular named variable token in the set of named variable tokens, a respective data type of the named variable token; and
  randomly generating, for the particular named variable token, a synthetic value based on the respective data type.

3. The method of claim 1, further comprising:
  identifying the set of named variable tokens in the set of templatized query pairs based on a predefined character sequence.

4. A method performed by one or more electronic devices, the method comprising:
  receiving a set of templatized query pairs, each templatized query pair of the set of templatized query pairs comprising a first templatized query in a first language and a corresponding second templatized query in a second language, wherein the second language is a domain-specific language specific to a provider network-hosted resource, each of the first and second templatized queries comprising a set of named variable tokens;
  generating a set of instantiated query pairs comprising substituting the set of named variable tokens with a set of synthetic values;
  retraining a pre-trained neural machine translation model using the set of instantiated query pairs to yield a fine-tuned neural machine translation model;
  translating, using the fine-tuned neural machine translation model, a query received by a provider network in the first language into a corresponding query in the second language;
  executing the query in the second language against the provider network-hosted resource to yield a result responsive to the query; and
  providing the result via a user interface.

5. The method of claim 4, wherein generating the set of instantiated query pairs is based on:
determining, for a particular named variable token in the set of named variable tokens, a respective data type of the named variable token; and
randomly generating, for the particular named variable token, a synthetic value based on the respective data type.

6. The method of claim 4, further comprising:
identifying the set of named variable tokens in the set of templatized query pairs based on a predefined character sequence.

7. The method of claim 4, wherein generating the set of instantiated query pairs is based on:
determining, for a particular named variable token in the set of named variable tokens, that the particular named variable token is a region data type; and
randomly selecting, for the particular named variable token, a synthetic value from a predefined set of values, the predefined set of values identifying different regions of a provider network.

8. The method of claim 4, wherein generating the set of instantiated query pairs is based on:
determining, for a particular named variable token in the set of named variable tokens, that the particular named variable token is a service data type; and
randomly selecting, for the particular named variable token, a synthetic value from a predefined set of values, the predefined set of values identifying different services offered by a provider network.

9. The method of claim 4, wherein generating the set of instantiated query pairs is based on:
determining, for a particular named variable token in the set of named variable tokens, that the particular named variable token is a resource name data type; and
generating a synthetic value for the value the particular named variable token based on a resource name template.

10. The method of claim 4, wherein generating the set of instantiated query pairs is based on:
determining, for a particular named variable token in the set of named variable tokens, that the particular named variable token is a tag key data type; and
randomly generating a sequence of characters as a synthetic value for the particular named variable token.

11. The method of claim 4, wherein generating the set of instantiated query pairs is based on:
determining, for a particular named variable token in the set of named variable tokens, that the particular named variable token is an account identifier data type, and
randomly generating a sequence of numbers as a synthetic value for the particular named variable token wherein the sequence of numbers conform to an account identifier format of customer accounts held with a provider network.

12. The method of claim 4, wherein each of the pre-trained neural machine translation model and the fine-tuned neural machine translation model comprises an encoder-decoder sequence to sequence model.

13. The method of claim 4, wherein generating the set of instantiated query pairs by substituting the set of named variable tokens with the set of synthetic values comprises expanding the set of template query pairs numbering in the hundreds into the set of instantiated query pairs numbering in the hundreds of thousands.

14. The method of claim 4, wherein the first language is a natural language and the second language is a domain-specific index query language.

15. The method of claim 4, wherein the provider network-hosted resource is an index comprising a set of provider network object identifiers, the provider network object identifiers comprising at least one of identifiers of a provider network resource, identifiers of a provider network region or identifiers of a provider network service.

16. A system comprising:
a first set of one or more electronic devices comprising at least a processor and a memory, the first set of one or more devices to implement a machine learning model hosting service in a provider network; and
a second set of one or more electronic devices, the second set of one or more electronic devices configured to:
receive a set of templatized query pairs, each templatized query pair of the set of templatized query pairs comprising a first templatized query in a first language and a corresponding second templatized query in a second language, wherein the second language is a domain-specific language specific to a provider network-hosted resource, each of the first and second templatized queries comprising a set of named variable tokens,
generate a set of instantiated query pairs comprising substituting the set of named variable tokens with a set of synthetic values, and
retrain a pre-trained neural machine translation model using the set of instantiated query pairs to yield a fine-tuned neural machine translation model, the fine-tuned neural machine translation model to be hosted by the machine learning model hosting service,
wherein a query received by the provider network in the first language is to be translated, using the fine-tuned neural machine translation model, into a corresponding query in the second language,
wherein the query in the second language is to be executed against the provider network-hosted resource to yield a result responsive to the query, and
wherein the result is to be provided via a user interface.

17. The system of claim 16, wherein generating the set of instantiated query pairs is based on:
determining, for a particular named variable token in the set of named variable tokens, a respective data type of the named variable token; and
randomly generating, for the particular named variable token, a synthetic value based on the respective data type.

18. The system of claim 16, wherein each of the pre-trained neural machine translation model and the fine-tuned neural machine translation model comprises an encoder-decoder sequence to sequence model.

19. The system of claim 16, wherein the first language is a natural language and the second language is a domain-specific index query language.

20. The system of claim 16, wherein the provider network-hosted resource is an index comprising a set of provider network object identifiers, the provider network object identifiers comprising at least one of identifiers of a provider network resource, identifiers of a provider network region or identifiers of a provider network service.

* * * * *